(12) United States Patent
Villax et al.

(10) Patent No.: US 12,170,654 B2
(45) Date of Patent: Dec. 17, 2024

(54) ONE-CLICK LOGIN PROCEDURE

(71) Applicant: MEDICEUS DADOS DE SAÚDE, S.A., Lisboa-Carnide (PT)

(72) Inventors: Peter Villax, Lisbon (PT); Ricardo Loura, Sr., Lisboa-Carnide (PT)

(73) Assignee: MEDICEUS DADOS DE SAÚDE, S.A., Carnide (PT)

( * ) Notice: Subject to any disclaimer, the term of this patent is extended or adjusted under 35 U.S.C. 154(b) by 503 days.

(21) Appl. No.: 17/429,866

(22) PCT Filed: Feb. 11, 2020

(86) PCT No.: PCT/EP2020/053478
§ 371 (c)(1),
(2) Date: Aug. 10, 2021

(87) PCT Pub. No.: WO2020/165174
PCT Pub. Date: Aug. 20, 2020

(65) Prior Publication Data
US 2022/0141207 A1    May 5, 2022

(30) Foreign Application Priority Data

Feb. 11, 2019   (PT) .......................................... 115304

(51) Int. Cl.
*H04L 9/40* (2022.01)
(52) U.S. Cl.
CPC ...... *H04L 63/0815* (2013.01); *H04L 63/0407* (2013.01); *H04L 63/0823* (2013.01); *H04L 63/083* (2013.01); *H04L 63/102* (2013.01)

(58) Field of Classification Search
CPC ............. H04L 63/0815; H04L 63/0407; H04L 63/0823; H04L 63/102; G06F 21/31
See application file for complete search history.

(56) References Cited

U.S. PATENT DOCUMENTS

| 6,711,682 B1 | 3/2004 | Capps |
| 8,954,758 B2 | 2/2015 | Leoutsarakos |

(Continued)

FOREIGN PATENT DOCUMENTS

| EP | 3208732 A1 | 8/2017 |
| JP | 2012123552 A | 6/2012 |

(Continued)

OTHER PUBLICATIONS

Wikipedia contributors. (Jan. 30, 2018). RSA (cryptosystem). In Wikipedia, The Free Encyclopedia. Retrieved 20:40, Oct. 13, 2023, from https://en.wikipedia.org/w/index.php?title=RSA_(cryptosystem)&oldid=823175017 (Year: 2018).*

(Continued)

*Primary Examiner* — Robert B Leung
(74) *Attorney, Agent, or Firm* — 24IP Law Group USA, PLLC; Timothy R DeWitt (57) ABSTRACT

A method and a device are presented to securely log in a computer user into a computer system by means of an anonymous identifier, thereby eliminating the use of a user name and a password and requiring just one click or touch by the user to log into the computer. The anonymous identifier uniquely identifies the user and may be used as a cryptographic key.

17 Claims, 6 Drawing Sheets

(56) References Cited

U.S. PATENT DOCUMENTS

| | | |
|---|---|---|
| 9,264,423 B2 | 2/2016 | Cox |
| 2010/0106512 A1* | 4/2010 | Hyndman .............. G06Q 10/10 705/1.1 |
| 2013/0034310 A1 | 2/2013 | Chen et al. |
| 2013/0238745 A1* | 9/2013 | Ramachandran .. H04N 21/2396 709/217 |
| 2014/0002594 A1 | 1/2014 | Chan et al. |
| 2014/0372896 A1* | 12/2014 | Raman .................... G06F 3/017 715/741 |
| 2015/0067118 A1* | 3/2015 | Gatto ................. H04L 63/0846 709/223 |
| 2016/0065541 A1* | 3/2016 | Winner ............... H04L 63/0815 726/6 |
| 2016/0105290 A1 | 4/2016 | Khalil et al. |
| 2017/0339157 A1 | 11/2017 | Jerrard-Dunne |
| 2019/0327223 A1* | 10/2019 | Kumar ................ H04L 63/0853 |
| 2020/0021448 A1* | 1/2020 | Chumbley ............ H04L 9/0894 |

FOREIGN PATENT DOCUMENTS

| | | |
|---|---|---|
| JP | 2013161123 A | 8/2013 |
| JP | 2018032235 A | 3/2018 |
| WO | 01/055822 A1 | 8/2001 |
| WO | 2014/117027 A1 | 7/2014 |
| WO | 2017207316 A1 | 12/2017 |

OTHER PUBLICATIONS

JP2012123552A (Haruki et al.), Published Jun. 28, 2012 (Machine translated on Jul. 17, 2024) (Year: 2012).*

* cited by examiner

ONE-CLICK LOGIN PROCEDURE

TECHNICAL FIELD

The present application is in the field of secure identification of a computer user in the login process into a computer system, who logs into a computer system by means of an anonymous identifier.

BACKGROUND ART

Logging into computer networks—the process whereby a user in a client computer is recognized by a server computer and granted access—is almost universally achieved by a user keying in a user name and a password into a software application or operating system. This requires a registration process, where the user enters name, personal identification data and preferences, as well as a chosen user name, which is often public and is usually connected with the person's name, and a user-defined, user-memorized password, which is only known to the user and to the host computer. The registration process takes place in a computer or computer terminal, and the user name and password are recorded by the host computer. During use, access is granted to the user by the host computer matching the strings of data entered by the user in the appropriate user name and password fields, with the corresponding user name and password recorded at user registration time, either in plaintext or in some encrypted or hashed form.

However, the proliferation of computer user accounts has led to a problem that is a characteristic of the internet. Whereas in the past, users normally had one school or work computer account, today they need to manage sometimes dozens of them, a process rendered even more difficult by the fact that many host computers require users to change their passwords frequently. This leads to non-secure behaviours, such as writing down one's passwords. Remembering all passwords in use is a difficult process and this difficulty may lead to behaviours which reduce security.

Moreover, in most computer systems using a user login system based on a user name and a password, the system administrator has the right to access a user's password to reset it, in case of need. This means that the system administrator has the opportunity to reset a user name's password to a new value and log in as the user, potentially conducting unauthorized or illegal operations under the unsuspecting user's identity. Password reset processes which bypass a system administrator by sending a password reset link to the user's email address are safer, but require the host computer to know the user's identity. There are other ways to enhance security, such as giving users electronic devices that generate a code associated with the current time and requiring them to enter this session code after the user name and password. Such systems are cumbersome and costly, requiring one new electronic device per host computer to be accessed. Recently, smartphones have begun to be used as session code generators, with great advantage over dedicated devices, but this still requires each application server to make available to each computer user its specific login software application, resulting in application clutter in the smartphone.

Moreover, there are increasing concerns over the unauthorized or unconsented use of personal data. A computer system which normally requires users to reveal their identities via their publicly known user names and then confirms them using an intrinsically unsafe password which can be changed without the user's immediate knowledge is woefully inappropriate to the protection of personal data.

Clearly, a new secure login system is needed which can address all the issues above and this should be done by eliminating altogether the user name/password method. This is particularly desirable in computer systems processing very sensitive data, such as for example health, biometric, genetic, ethnic, financial, property, asset, tax, voting, purchase and transaction history data. It would be particularly useful to manage all of these data in a way that clearly and securely associates them with a person, provided it is not by means of the person's name or personal identifiers which can be traced back to the person's name.

There are cases in the prior art where there have been attempts to eliminate the password, but not the user name.

U.S. Pat. No. 8,954,758 replaces the password with a user generated gesture that is interpreted, mathematically converted into a string of characters which is appended to a login key to complete the full login expression. In other words it replaces an alpha-numeric password to one derived from points in space traced by a human gesture and therefore still requires the host computer to store the user name and the full login expression.

U.S. Pat. No. 9,264,423 allows a password-less login by sending to the user's pre-registered communications device, such as the user's mobile phone, a prompt to accept or decline the user's login request initiated at a different computer or terminal. The response to the prompt is sent to a login authority server, which then transmits the user's response to an application server to grant or refuse access. This is a complex system, requiring four different computers: the user's client device, where the user session starts; an application server, which receives the client's user identifier through a user-editable field as part of the user's login procedure; a login authority server, which receives the application server's request for user authentication; and a user device, such as a mobile phone, where the same user receives an acknowledgement request from the login authority server to accept the login request and to which it responds affirmatively or negatively. Moreover, the user is identified by means of a user identifier, which can be a random number or user selected. The described method requires the application server to know the user's name and all four computers need to participate every time there is a login attempt.

We have now invented a method and a device where login control resides in the user's personal computing device, such as a smartphone, and the login method does not make use of a conventional user name or employ any kind of password or the user's smartphone number or email address and only requires the user's computer and one application server. The application server is a server to which the user intends to connect to carry out data processing of interest. At login time, the user remains anonymous to the application server or host computer and is identified solely by means of an anonymous identifier.

SUMMARY OF THE INVENTION

The present disclosure describes a device used by the user for logging in an application server, designated as a personal computing device, such as a smartphone, a tablet, a laptop computer or a personal computer. The personal computing device is provided with a processor, a memory, a data storage medium, a display unit, one or more input devices such as a keyboard, a pointing device, a camera, a microphone, a motion detector, etc., a communications subsystem, an operating system, a power supply and means to execute software programme instructions. The personal computing device is connected through a communications network, such as a private network, a public network or the internet to one or more application servers, such as a host computing system, a corporate server, a webserver, a cloud computing system or the like.

The application server substantially comprises the same components as the personal computing device, but its processing capacity, memory and storage media will be of much greater capacity and it will have access to the communications network through a much larger bandwidth to accommodate the simultaneous processing of multiple users.

In order to verify the user's identity and to authenticate the user's personal computing device as a device under the user's control, in one embodiment of the present disclosure an identity verification server is used and its components and capacity are similar to those of the application server described above.

In order to process the data in the manner described in the present disclosure, the participating computers are programmed by computer programmes specifically written for the tasks described. The personal computing device comprises at least a login software application, the application server comprises at least a user registration software application and a login and access software application (collectively the application server software applications) and the identity verification server comprises at least the user identity verification software application. All software applications in each type of computer—personal computing device, identity verification server and application server—also include cryptography software to generate at least asymmetric keys and digital signatures to ensure secure communications between all three computer systems.

In one aspect of the present invention, there is described a method to execute a secure user login procedure without a user-defined user name or user-defined password, where the user's personal computing device connects to a software distribution service and downloads and installs a login software application into the personal computing device, where the login software application generates a private key and an associated public key which will also serve as the user's anonymous identifier. In the present disclosure, the public key is known only by the login software application in the personal computing device and by the login and access software application in the application server. When it is run, this login software application connects to the login and access software application in the application server and transmits the anonymous identifier to it and the application server records the anonymous identifier in its user registration database, by means of the user registration software application. Once the user registration process is concluded, the user can run the login software application, request a login into the application server and identify itself by means of the anonymous identifier, the login process and user anonymous identifier being confirmed by the login and access software application running in the application server. This occurs without the user having to enter a user name or to enter a system password which do not exist because they were never created. Similarly, this login method between the personal computing device and the application server does not employ any kind of biometric, fingerprint and face image files stored in the application server as passwords for login verification, as these elements are far too precise in identifying an actual person and the application server could then easily re-identify its anonymous users.

In order to increase security, the login software application running in the personal computing device may comprise a screen lock device that will be stored locally in the personal computing device and require the user to unlock it to allow the operation of the application to continue. When the login software application has been installed and is run, it requires the user to unlock the screen lock device to ensure that it is being used by the authorized user of the personal computing device. Unlocking the screen lock device can be by means of a conventional PIN number, or be implemented through facial or fingerprint recognition, depending on the security features present in the smartphone or tablet. This PIN or the digital representation of the user's face or fingerprint will not be transmitted to the application server as a system password and access to the personal computing device and to the login software application is by means of opening this local screen lock device. Failure to open the screen lock device will prevent further use of the login software application and no login procedure will be authorized by it. If the screen lock device is successfully opened, then the login software application will take over from the user the login procedure.

In another embodiment, it will be important to absolutely confirm the user's identity, so that the application server is able to trust a user registration request from a user whose name identity is unknown to it. This requires the function of a separate, independent user identity verification server which already contains population user data. This server may authenticate the user's identity by using population data containing at least the user's name and contact details. This will be done once only, at the time of user registration and may allow the user to enter user preferences, including consent for the application server to use user personal data and other legal formalities. In this case, the user will enter the name, and all personal identifiers which may be required to facilitate its positive identification, such as name, date of birth, sex, address, postcode and official identification codes, such as citizen's ID number, passport number, etc. Advantageously, these data may be acquired by photographing the user's ID card or driver's license using the personal computing device, and using character recognition software therein to automatically and reliably obtain the data of interest. The name and personal identifiers are then transmitted by the login software application in the personal computing device to the user identity verification server, where the user identity verification software application uses these personal identifiers to search for that specific person's personal record stored in its databases and, on finding one, reads that person's known cell phone number or email address. Useful identity verification servers include official government databases of national identity card or driving license departments as well as user databases of cell phone operators or banks. On finding a match between the received personal identifiers and the person's personal record in its database, the user identity verification server sends a command by texting a message to the user's known cell phone number or sends an email to its known email account, or any other kind of electronic message, prompting a confirmation response by the user that it is aware of and is the person responsible for the ongoing new user registration procedure. On receiving an affirmative response, the user's identity is confirmed, the user's personal computing device is authenticated as that user's login and access device and the identity verification software application in the identity verification server sends a command to the login software application that it is authorized to conclude its installation in the personal computing device and become operational. In this authentication process the identity verification server need only be contacted once by the user's login software application, the user identity verification software application verifying the user's identity and authenticating the login software application together with the personal computing device as the user's login and access device.

The authentication process confirms the user's personal computing device as a valid login and access device and logging into the application server will be executed solely by the login software application in the personal computing device, without any other user intervention. Other procedures may be used to absolutely confirm the user's identity, such as sending a confirmation code by post to the user's known address, which the user will have to key into the login software application to conclude its installation, or even physically appear in person at a verification centre for in-person confirmation. State-provided secure identity authentication methods are also useful.

In one embodiment, the anonymous identifier will be transmitted in encrypted form to the identity verification server and be recorded together with the user's name and personal identifiers. In this case, the identity verification server can be used to re-identify the user, should a legitimate need arise at a later date.

It will be noted that when attempting to log in subsequently into the application server, in most embodiments, the login software application will not transmit a user name, personal identifiers or a password, or any elements which could be used to recover the user's known identity. This is useful in the processing of valuable but sensitive personal data, where there is need to obtain data, but to do so without being able to identify the user by its name or receiving any personal identifiers which would allow the re-identification of user.

During the installation process, a cryptographic key software programme contained in the login software application in the personal computing device generates a pair of cryptographic keys using the known method developed by Rivest, Shamir and Adleman (RSA), or more preferably the known method of the Elliptical Curve Digital Signature Algorithm (ECDSA), both asymmetric methods of cryptography. Each pair of cryptographic keys comprises a private key and a public key and its use is widely known in the cryptography community and they are hereinafter referred to as cryptographic keys or private and public keys. Conveniently, the public key will be used as the user's anonymous identifier and will only be used for login purposes with the application server of interest. Indeed, several pairs of cryptographic keys may be generated, as many as are needed to log into different application servers of interest, so that each public key/anonymous identifier may be used for logging into one application server only. Although described as "public", it will be noted that in fact the user's public key will be known only to the login and access software application in the application server and to the login software application in the personal computing device and will be kept confidential to all other parties, including the user. This is an added security feature, as the login process can only be initiated in the user's personal computing device where the login software application was installed. This way the public key/anonymous identifier is a valid, confidential identifier of the user operating the personal computing device which generated the cryptographic keys and used for securely logging in into the application server of interest, to the exclusion of conventional user-defined user name and password. However, it is not essential that the anonymous identifier be the same as the cryptographic public key and indeed it can be any other sufficiently complex number. In addition to the user, the identity verification server and the application server may also use software to generate their own pairs of cryptographic keys to communicate securely with the user's login software application.

When not a cryptographic public key, the anonymous identifier can be any randomly generated number similar in length and complexity to an anonymous identifier generated as a public cryptographic key as described above.

An essential feature of the public key/anonymous identifier is that it needs to be as near to unique as possible. The private cryptographic key will be generated by an appropriate cryptographic software programme comprised in the login software application, which will calculate the associated public key. A number of at least 10 digits for the private key (and an associated public key of the same or similar length) is able to allocate a single number to every human being in the planet, but is too short to ensure that two persons will not receive the same number in a random number generation process. A number of at least 100 digits will provide a significant increase in the number space and consequent reduction in the probability of two different persons being allocated the same random number, while a number of 1000 digits or more will give even better security. In current implementations of the method disclosed herein, a hexadecimal code of 20 bytes representing 40 characters is used and hash numbers may be as long as 2048 bytes. Their complexity may grow in the future as faster computers are developed. Though the anonymous identifier could be seen as a user name or a password, it cannot be so considered as it is neither user-defined nor user-memorizable nor user-entered. Its length and lack of meaning would make it nearly impossible for the user to readily copy or remember it even if it were readily accessible by the user, but it remains hidden in the login software application in the user's personal computing device.

Such a login process employing public keys or random numbers used as anonymous identifiers, when sent by the login software application to the login and access software application in the application server, allows the application server to deem them valid and sufficient means to grant the user login access to the application server.

The actual length of the anonymous identifier will be determined by best practice at the time of system implementation, as well as the continued use of the RSA or ECDSA systems or adoption of a newer system that is more secure against unauthorized use or breach.

Methods to guarantee that the anonymous identifier is unique and has not been attributed yet—unlikely but not impossible—include steps by the identity verification server to search its user registration database which includes anonymous identifiers and therein look for exact matches with the received new user's anonymous identifier. If a match is found, the identity verification software application in the identity verification server will issue and transmit a command to the login software application to re-generate a new private key or a new random number, resulting in a new public key/anonymous identifier. Only when the identity verification server has verified that the new anonymous identifier is unique will the installation of the login software application be instructed by the identity verification server to conclude.

Logging into computer systems and application servers using the method of the present application allows the user to initiate a login and access procedure by means of a single click or touch in its login software application, which will trigger the transmission of the anonymous identifier to the login and access software application in the application server, and it will in turn grant login access solely on the basis of the received anonymous identifier.

These operation and design features make the personal computing device comprising a login software application and an anonymous identifier, a login device. It is no longer the user that logs in, it is the personal computing device under the user's control which does so. This characteristic is independent of whether the identity verification server was used to confirm the user's identity or not.

For even higher security, digital signatures may be used. A digital signature is a mathematical scheme for verifying the authenticity of digital messages or documents. A valid digital signature gives a recipient reason to believe that the message was created by a known sender (the user is authenticated), the sender cannot deny having sent the message (the user cannot repudiate it) and the message was not altered in transit (its integrity is verifiable). Known digital signature methods include RSA-based signatures, DSA (Digital Signature Algorithm) signatures and other methods and they employ a randomly generated private key and an associated public key. Here this pair of keys can be same as that which was generated above in the generation of the anonymous identifier. In one embodiment of the present disclosure, the login software application comprises digital signature software and generates a byte array which will be its digital signature, calculated using a known mathematical processing of the user's private key applied to the content of the message to be signed. Here, the content of the message to be signed is the user's public key/anonymous identifier. The digital signature and the message itself are transmitted to the identity verification server or to the application server, whenever there is a need to verify that the message did indeed originate in the login software application in the user's personal computing device—or in any other user software application.

The receiving party is able to convert the received digital signature back into the message containing the user's public key, read it and compare it with the content of the received message itself. If there is a match, the user is authenticated by the receiving party. Similarly, the identity verification server may digitally sign its command for the installation of the login software application to successfully conclude in the user's personal computing device by digitally signing a message using the identity verification server's private key where the signature message is the user's public key/anonymous identifier. In this embodiment, only on receiving this digitally signed message does the installation of the software login application continue in the personal computing device and successfully conclude.

Once the installation of the login software application has concluded successfully, the user may use it to contact application servers known to the login software application and initiate a user registration procedure. Digital signatures are useful here, especially the digital signature generated by the identity verification server, as this, when transmitted to the application server will guarantee that the user exists, that its name identity has been already confirmed, that the anonymous identifier is a valid identifier of that unknown but yet authenticated person and that the verification process was carried out by a known identity verification server. With these guarantees, the user registration software application in the application server may record the user in its user registration database under the user's anonymous identifier.

It will be appreciated that while the login procedure is anonymous, the anonymous identifier is a unique code for a person, and it resides in a personal computing device that may in addition have been authenticated by the identity verification server as being under that person's control. The anonymous identifier is difficult to copy, hack or penetrate, making the disclosed method a very secure login procedure. It will be noted that the login software application can be included in any other software application where the provider wishes to use the functionality of the login device and method described in the present disclosure.

Thus, when an application server receives an incoming request to log in originating from a login software application where the identity of the user has been confirmed and authenticated by an identity verification server, the application server can grant access to a login request based solely on the basis of the user's anonymous identifier and provide a level of application functionality and security commensurate with the user being an authenticated but unknown person. This is the case when the application server processes sensitive personal data.

If the identity of the user has not been confirmed by an identity verification server, the application server can still grant access to a login request based solely on the basis of the user's anonymous identifier, and this will be appropriate in situations not requiring an absolute certainty of the user's name identity. This is the case when the application server seeks to track a user's habits, visits, preferences or choices and the user is willing to share this information.

Insofar as the login procedure described in the present disclosure may be used not just to open a user session in a server computer, but every time there is an exchange of information between the client and the server, thereby continuously verifying the user's anonymous identifier, the login procedure may be considered as a continuous access verification procedure, and the expression login procedure shall also contain the meaning of continuous access verification procedure.

In another aspect a non-transitory computer readable storage medium is described. The computer readable medium includes computer-executable instructions which, when executed, configure a processor of a personal computing device to connect to a software distribution service and download and install a login software application into the personal computing device and generate an anonymous identifier, and then run the login software application which transmits the anonymous identifier to an application server. Further instructions configure also the processor of the application server to receive the anonymous identifier and record it in its user registration database. When the login software application is used by the user to log into the application server by transmitting its anonymous identifier, the application server's processor is configured to process the received anonymous identifier, to attempt to match it with one of the entries in its user registration database and finally to grant the login software application and the user access to the application server.

In use, the login and access method of the present disclosure offer a more convenient and practical method to log into a computer, but which does not reduce security and in fact enhances it in relation to methods in the prior art. By automating the process and placing it in the user's personal computing device, the user is no longer required to memorize or write down several passwords nor required to identify itself by means of a user name. This considerably reduces key errors, mistaken passwords and locked accounts due to too many sequentially entered incorrect passwords. However the most important benefit is that the user needs only to select in its login software application the application server to connect to, and with one single action—a mouse click, a finger tap or any other pointer action—successfully log in. In the absence of a system password, it is the personal computing device that takes over the process of logging in by means of the anonymous identifier. It will be noted that the method of the present disclosure is different from current password management systems, where a login file residing in the user's personal computing device contains one or more specific user names and passwords defined by the user at registration time, for each application server. In this method of the prior art the personal computing device logs into the application server of interest by sending the user-defined and user-input user name and system password.

Other example embodiments of the present application will be apparent to those of ordinary skill in the art following a review of the following detailed description in conjunction with the drawings.

SUMMARY DESCRIPTION OF THE DRAWINGS

In the drawings, numbers refer to like elements and features in the description.

DETAILED DESCRIPTION OF THE DRAWINGS

Figure 1A:
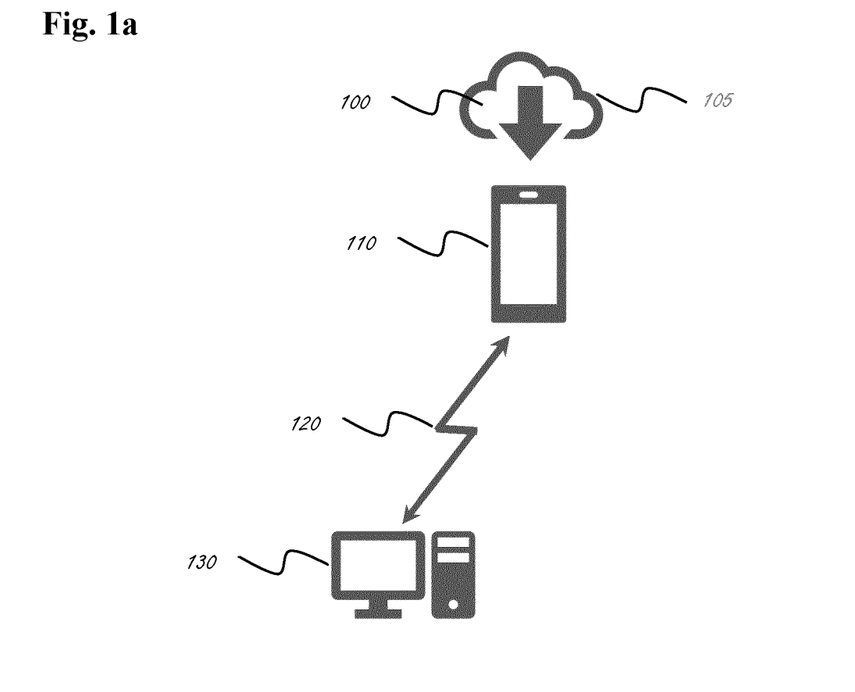
FIG. 1a is a block diagram of a system architecture used to download and install a login software application and verifying the user's identity in an identity verification server, according to an example embodiment of the present disclosure.

FIG. 1a is a block diagram of a computer architecture needed to download and install a login software application of the present disclosure. This is a first step necessary for the successful installation of the login software application in the user's personal computing device. Login software application 100 resides in a software distribution service 105 in the internet. A user operating a personal computing device 110 such as a smartphone, a tablet, a laptop computer or a personal computer downloads from software distribution service 105 the desired login software application 100. The user installs the login software application 100 in its personal computing device 110 in accordance with the method described in FIG. 6.

The personal computing device 110 connects to an identity verification server 130 via the communications network 120. This server 130 searches in its user database for a matching user and on finding it, confirms the user's identity and allows continued installation of the login software application 100, in accordance with the method described in FIG. 6, steps 600 to 630.

Figure 1B:
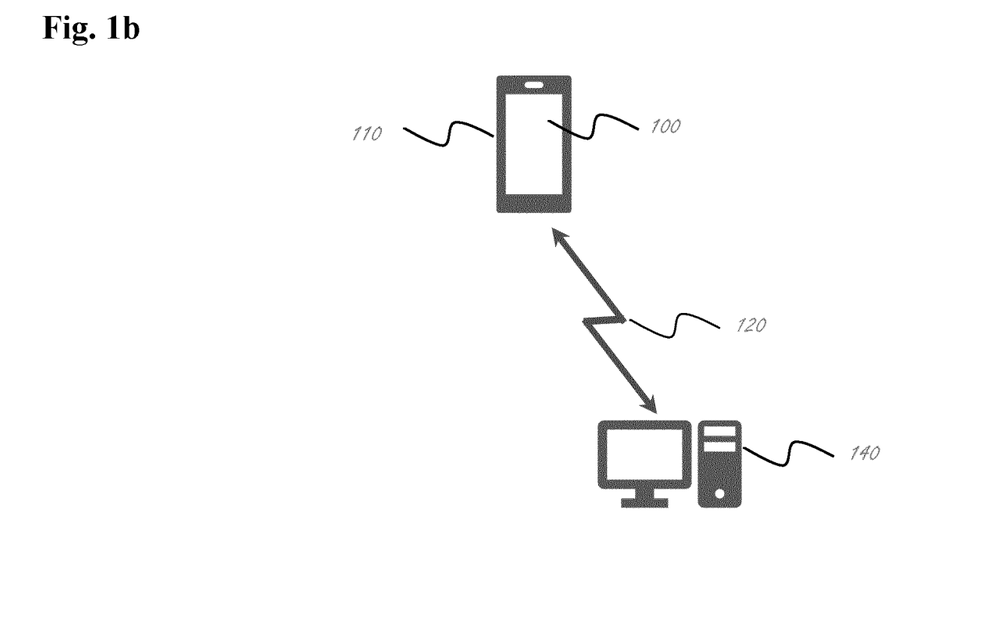
FIG. 1b is a block diagram of a system architecture used to securely log into an application server, according to an example embodiment of the present disclosure.

FIG. 1b is a block diagram of an example of a computer architecture needed to create new users in the present disclosure. This is a second step where, after the login software application 100 has been installed, the user's personal computing device transmits a request to register this user in an application server of interest. The user runs the login software application 100 in its personal computing device 110 to connect to an application server 140 via the communications network 120 in accordance with the method described in FIG. 7, steps 700 to 730. The login software application 100 transmits the user's anonymous identifier and the identity confirmation data, if issued by the identity verification server when the optional authentication process was used. The application server 140 receives the user's anonymous identifier and identity confirmation data, and on successfully validating it, records the user as a valid new user in its user registration database.

FIG. 1b is also a block diagram of an example of a computer architecture needed to initiate new login procedures for users already registered in the user registration database 480 in the application server 140, in the present disclosure. This is a third second step where, after the new user has been successfully registered, the login software application 100 in the user's personal computing device 110 transmits a request to an application server 140 of interest to initiate a login procedure. The user runs the login software application 100 in its personal computing device 110 to connect to an application server 140 via the communications network 120 in accordance with the method described in FIG. 7. The login software application 100 transmits the user's anonymous identifier. The application server 140 receives the user's anonymous identifier, and on successfully validating it in accordance with the method described in FIG. 7 steps 760 to 790, allows the user to log in and initiate a user session at the application server 140.

FIGS. 1a and 1b describe an example of the minimal computer architecture required for the anonymous login procedure of the present application. The identity verification server 130, if used, is only used once to validate the user's identity and authenticate its personal computing device 110 which will be used to connect and login to the application server 140.

Figure 2:
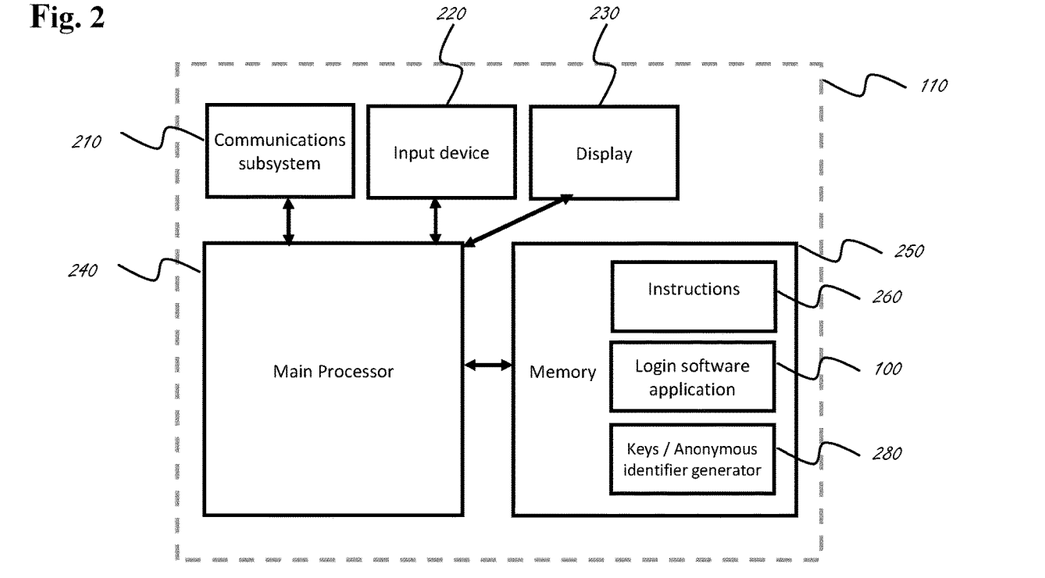
FIG. 2 is a block diagram of a personal computing device, according to an example embodiment of the present disclosure.

In FIG. 2, an example personal computing device 110 is illustrated in block diagram form. In the example, the personal computing device 110 is provided with a main processor 240 which connects to various device subsystems such as a communications subsystem 210, an input device 220 such as a keyboard, a mouse or a touch screen and a display 230 such as a screen. It will be appreciated that the personal computing device 110 has many other components which are not individually identified.

The communications subsystem 210 is used to connect the personal computing device 110 to other computers, such as the software distribution service 105, the identity verification server 130 and the application server 140 to manage the data exchanges described in the present disclosure, such as are involved in the login software application 100 download and installation, user identity verification, user registration, anonymous identifier transmission and login procedure initiation and conclusion.

The main processor 240 is associated with at least one memory 250 which may store data and processor-executable instructions 260, which when executed configure the processor 240 to download a login software application 100 and generate a private key and an associated public key/anonymous identifier using the cryptographic software programme 280 comprised in the login software application 100, following one of the RSA or the ECDSA methods or equivalent.

Figure 3:
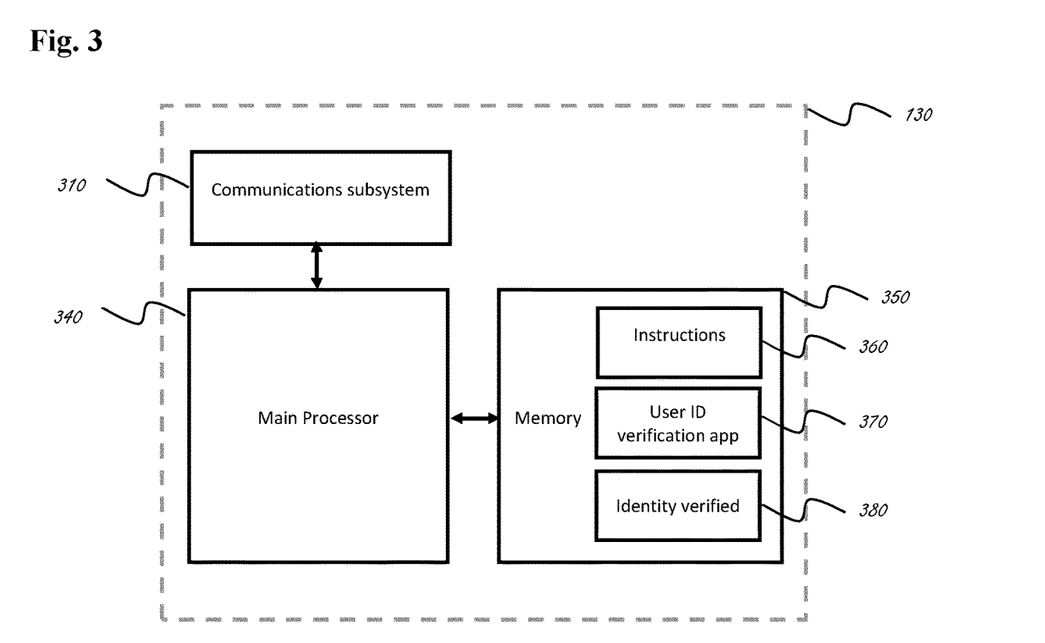
FIG. 3 is a block diagram of an identity verification server, according to an example embodiment of the present disclosure.

In FIG. 3, an example identity verification server 130 is illustrated in block diagram form. In the example, the identity verification server 130 is provided with a main processor 340 which connects to a communications subsystem 310. It will be appreciated that the identity verification server 130 has many other components which are not individually identified.

The communications subsystem 310 is used to connect the identity verification server 130 to other computers, such as the personal computing device 110 to manage the data exchanges described in the present disclosure, such as are involved in user identity verification and personal computing device 110 authentication.

The main processor 340 is associated with at least one memory 350 which may store data and processor-executable instructions 360, which when executed configure the processor 340 first to receive a request for identity verification from the login software application 100 in a user's personal computing device 110 and then to execute the steps of the user identity verification software application 370, and finally and if verification is successful, to issue a command 380 to the login software application 100 to continue and successfully conclude installation.

Figure 4:
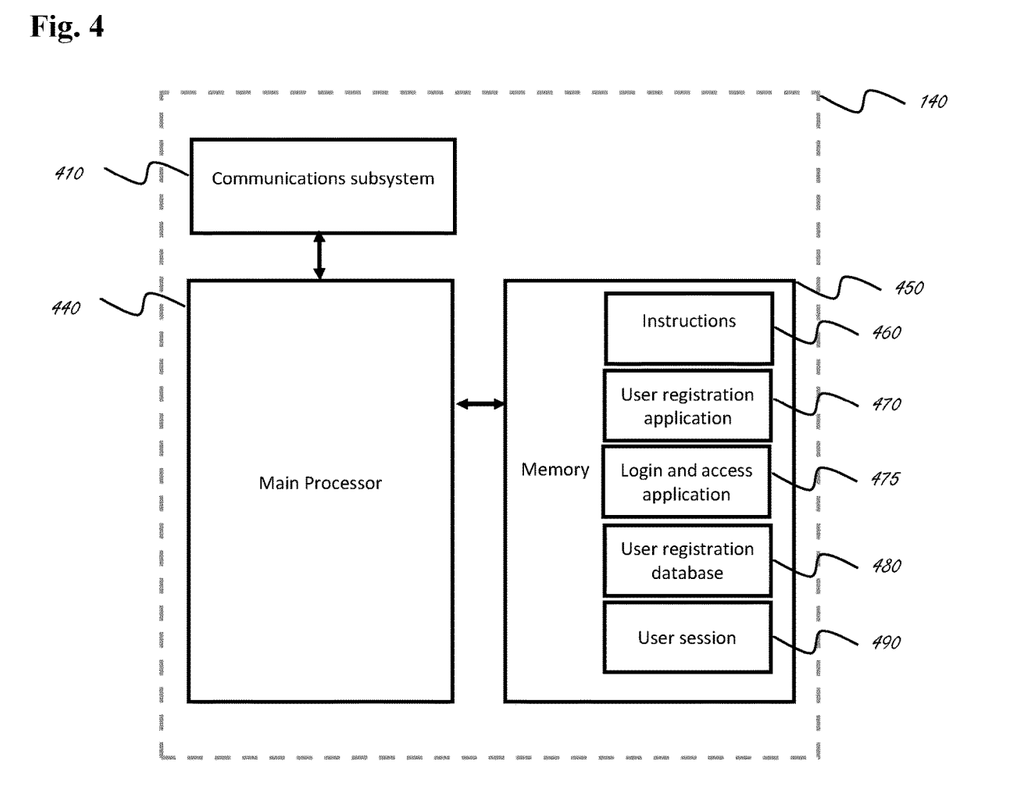
FIG. 4 is a block diagram of an application server, according to an example embodiment of the present disclosure.

In FIG. 4, an example application server 140 is illustrated in block diagram form. In the example, the application server 140 is provided with a main processor 440 which connects to a communications subsystem 410. It will be appreciated that the application server 140 has many other components which are not individually identified.

The communications subsystem 410 is used to connect the application server 140 to other computers, such as the personal computing device 100 to manage data exchange described in the present disclosure, such as is involved in connecting to a personal computing device 110, receiving transmitted information from the login software application 100 identified with an anonymous identifier.

The main processor 440 is associated with at least one memory 450 which may store data and processor-executable instructions 460, which when executed configure the processor 440 first to receive a request from the login software application 100 in a personal computing device 110 in the form of an anonymous identifier, which in a first connection is processed by the user registration software application 470 and in all connections is processed by the login and access software application 475. The first connection causes the user registration software application 470 to check whether the anonymous identifier already exists, and if not, to create a new entry for it in the user registration database 480. All connections cause the login and access software application 475 to verify the validity of the anonymous identifier, by matching the received anonymous identifier to a user registration database 480 containing anonymous identifiers. If the anonymous identifier is successfully matched, then the processor 440 is configured in application server 140 to grant login access to the login software application 100 and to open user session 490.

Figure 5A:
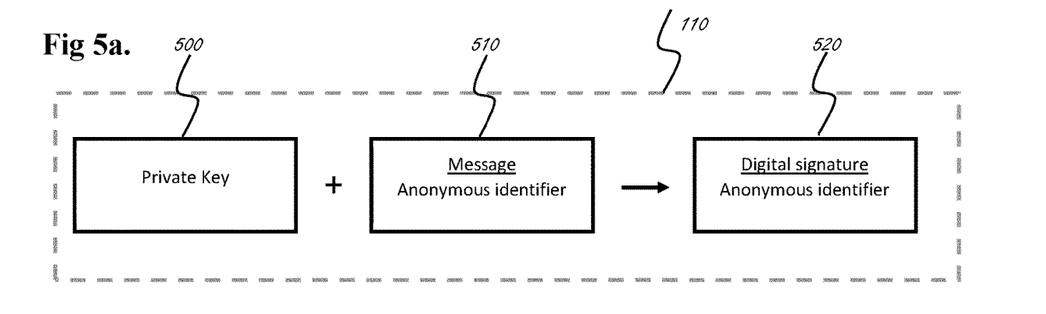
FIGS. 5a, 5b and 5c are block diagrams of a method for digitally signing messages and for verifying the message as valid, according to an example embodiment of the present disclosure.
Figure 5B:
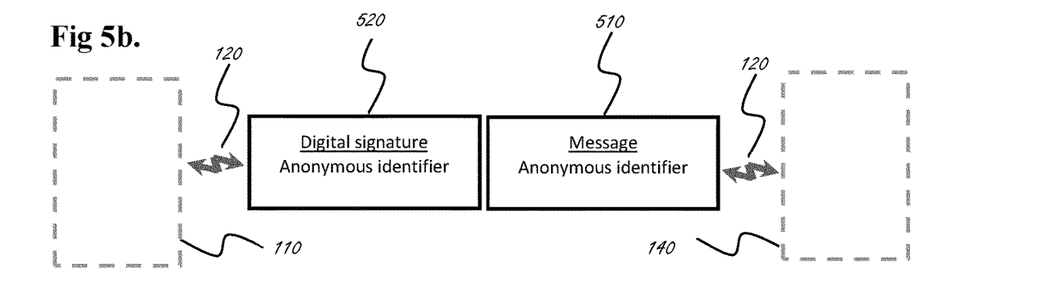
Figure 5C:
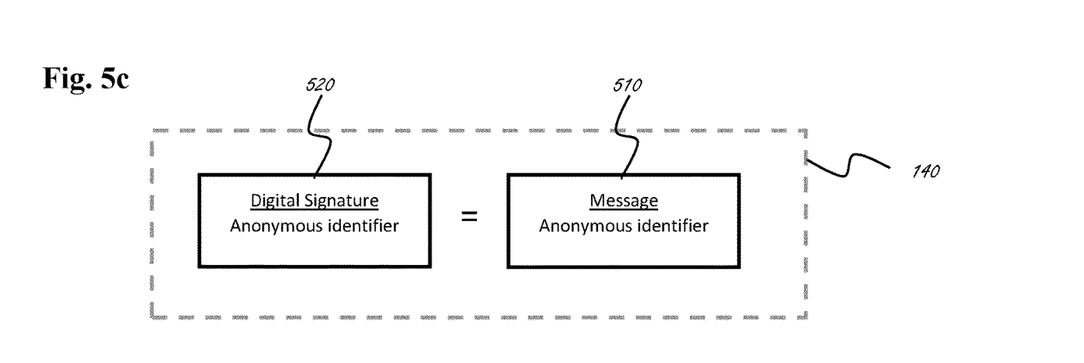

In FIGS. 5a, 5b, and 5C an example is given in block form of the method of the present disclosure to digitally sign and verify a message. In this case, the message to be signed is the anonymous identifier.

In FIG. 5a, the login software application 100 in personal computing device 110 uses its private cryptographic key 500 to digitally sign the message 510 comprising the anonymous identifier, using a known method such as the Digital Signature Algorithm to produce a digitally signed anonymous identifier message 520.

In FIG. 5b the login software application 100 in personal computing device 110 transmits the digitally signed anonymous identifier message 520 and the anonymous identifier message 510 to the application server 140, using communications network 120.

In FIG. 5c the digital signature software comprised in the login and access software application 475 in the application server 140 receives the digitally signed anonymous identifier message 520 and the anonymous identifier message 510, processes the digitally signed anonymous identifier message 520 using a known method such as the Digital Signature Algorithm and compares the result of the processing to the message containing the anonymous identifier 510. If the two expressions are equal, then application server 140 has the assurance that the login or access request have originated with the user identified by the anonymous identifier.

Figure 6:
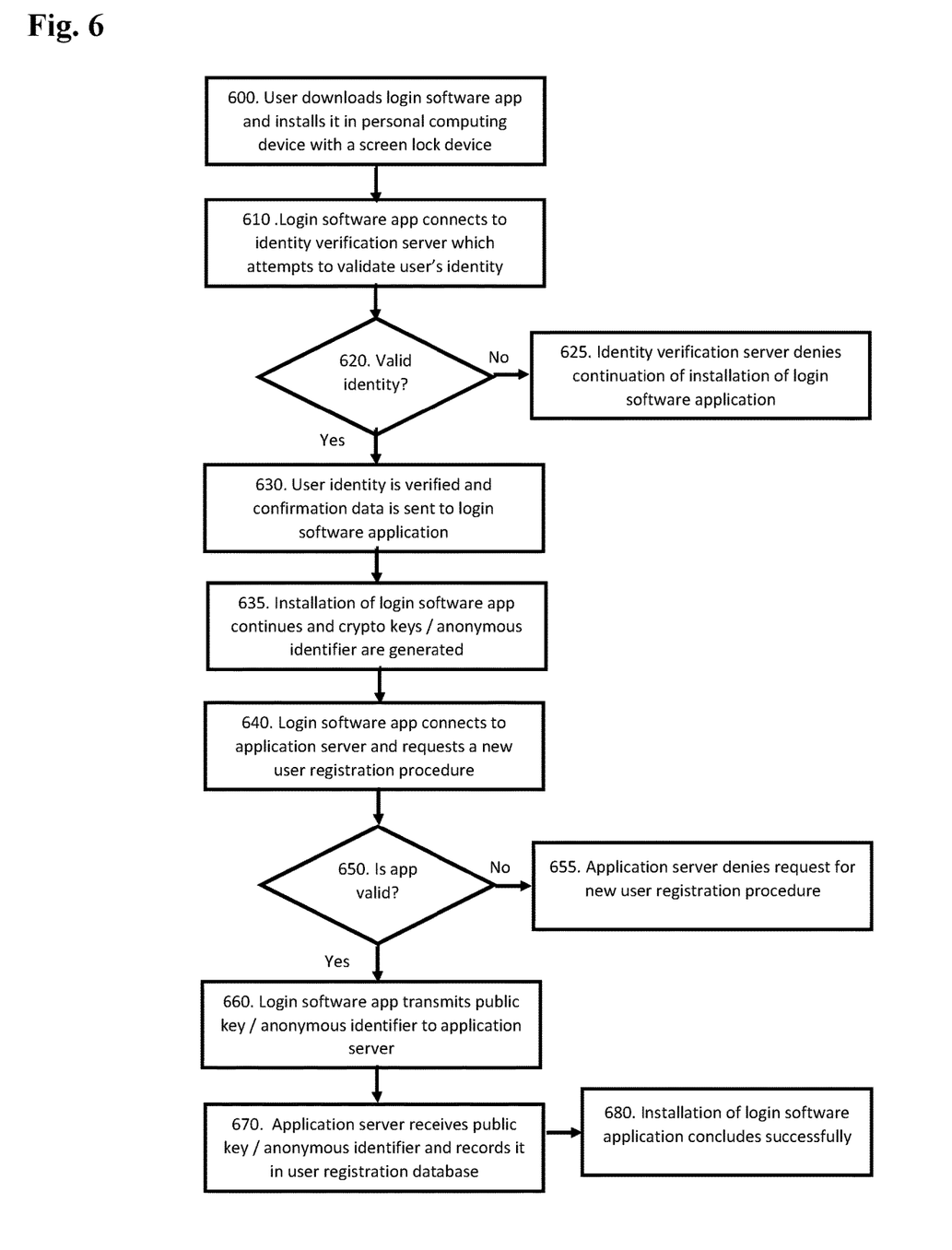
FIG. 6 is a flowchart of a method for downloading and installing a login software application in a personal computing device, according to an example embodiment of the present disclosure.

In FIG. 6, an example is given in flowchart form of the method of the present disclosure to download a login software application 100, verify the identity of the user and successfully install it in a personal computing device 110.

In step 600, a user operates a personal computing device 110 such as a smartphone or tablet and points it to a software distribution service 105 such as App Store, Google Play or a software distribution webserver and downloads the desired login software application 100. If using a personal computer, the user accesses a software distribution webserver 105 and downloads the desired login software application 100. The user initiates the installation of the login software application 100 in the personal computing device 110.

In the installation process, the login software application 100 also requests the user to enter a code for a screen-lock device, such as a four- or six-digit numeric or alphanumeric PIN, or longer, or a picture of the face or fingerprint, or use any other means of biometric recognition functionality present in the personal computing device 110. This screen lock code and device remains in the personal computing device 110 and its digital representation will not be transmitted to an external party such as the identity verification server 130 or the application server 140. This is a locally-stored code. This embodiment will be particularly useful in applications involving the processing of sensitive personal data, where it is important to safeguard the personal computing device 110 against unauthorized access and unauthorized use as a login device.

In other embodiments, particularly in corporate systems, there is a need for the user to be known and in this case the installation of the login software application 100 will include the user entering name, user name, personal identifiers, preferences and other information of interest which may be transmitted at user registration time, so that the application server 140 is able to recognize the user as a valid member of the organization. The difference from current login systems is that no password is generated by the user or stored in the corporate application server 140. In all embodiments, login will be achieved by the user at least opening the screen lock device on the login software application 100, and selecting and clicking or touching a login button for the application server 140 of interest.

Step 610 describes an aspect of an embodiment where there is a need to absolutely confirm the user's identity and authenticate its login software application 100 and personal computing device 110. If not required, the operation continues at step 635. Where it is required, the login software application 100 connects to an identity verification server 130 containing large amounts of personal data, so large that there is a high probability that the present new user will likely be already known and recorded in the database of the identity verification server 130. On receiving the user's name and personal identifiers, the identity verification software application 370 in the identity verification server 130 uses the user's identity details to locate the same user in its own databases. On finding it, the identity verification software application 370 reads in the found user record contact details such as the user's cell phone number, email address or any other electronic address and sends a text message to that cell phone or an email message to the user's email account, requesting the holder to acknowledge its name and whether it is the initiator of the new user registration procedure. This confirmation can be simple, such as merely clicking on or touching a link that is displayed on the screen of the personal computing device 110. Clicking this link sends the information back to the identity verification server 130 that the user has indeed confirmed, on this known smartphone, tablet or computer personal computing device 110, the information received. The confirmation can be made more secure by including in the text message or email a numeric code, which the user is then requested to manually input into the login software application 100, a very secure procedure used by banks and state agencies. After the user has entered its response and the login software application 100 has transmitted it, the login software application 100 stands by for a response by the identity verification server 130.

In step 620, the identity verification software application 370 processes the response received or not received from the user. A decision can be made by the identity verification software application 370 on the basis of the user input—affirmative or negative—or judging it negative if there is no response after a certain amount of time, say 60 seconds, counted by a timer included in the identity verification software application 370 running in the identity verification server 130.

If the user response was negative or if there was no response, then in step 625 the identity verification software application 370 sends a command for which the login software application 100 in the user's personal computing device 110 has been standing by, which is in this case to stop the installation of the login software application 100 in the user's personal computing device 110.

If the user response was positive and was received within the pre-set time, then in step 630 the identity verification software application 370 sends the user identity confirmation data (timestamp, confirmation number, identity verification server 130 name and address) and a command to the login software application 100 allowing installation to continue. Both are recorded by the login software application 100.

In step 635, the login software application 100 generates the user's cryptographic private and public keys/anonymous identifier, using the cryptographic software programme 280.

In step 640, the login software application 100 connects to the login and access software application 475 in application server 140 and requests a new user registration procedure, for a user identified by its anonymous identifier. After the command has been transmitted, the login software application 100 stands by for a response by the application server 140.

In step 650, the login and access software application 475 in application server 140 tests whether the request is coming from a genuine copy and valid installation of the login software application 100, and this is achieved through known cryptographic methods.

If the test is not successful, then in step 655 the login and access software application 475 in application server 140 denies the request for a new user registration procedure and sends a command to the login software application 100 terminating its operation. If it is successful, then in step 660 the login and access software application 475 sends a command to the login software application 100 to continue its operation and to transmit to the application server 140 the user's cryptographic public key/anonymous identifier and user identity confirmation data, if any.

In step 670, the login and access software application 475 in application server 140 receives from the login software application 100 the transmitted cryptographic public key/anonymous identifier and the user identity confirmation data, if any, and causes the user registration software application 470 to create a new user in the user registration database 480.

In step 680, successful recording of the new user by the application server 140 results in a command sent by the login and access software application 475 transmitted to the login software application 100, signalling to it that it may record the installation of the login software application 100 as successfully concluded. The login software application 100 records the name of the application server 140 as a computer system which has confirmed the user for login operation and authenticated the software login application 100 together with its personal computing device 110 as the login device. Only login software applications 100 that have been successfully installed to this point will be recognized by the login and access software application 475 in the application servers 140 of interest receiving an incoming login request; failing this, no login attempt will be allowed by the application server 140.

Figure 7:
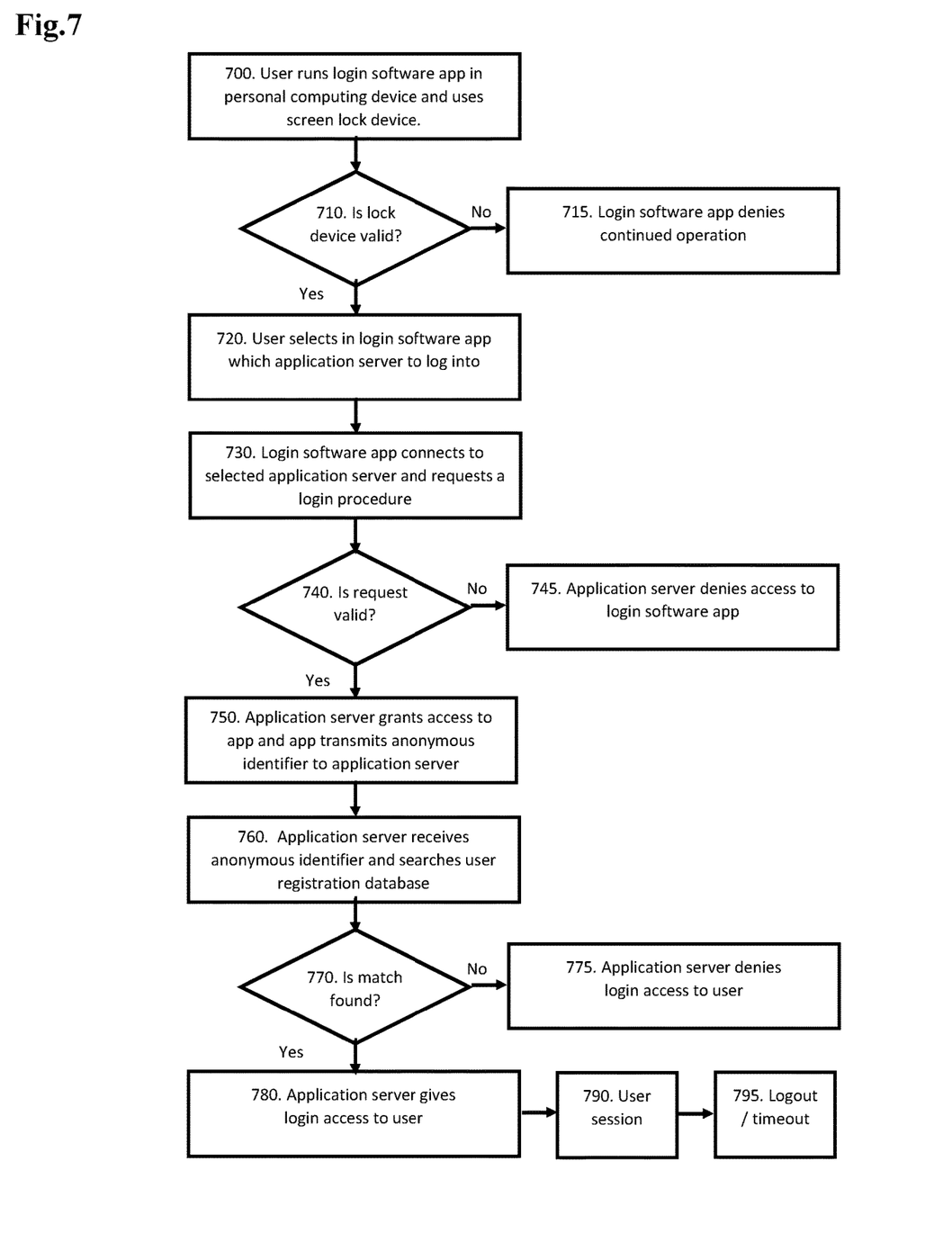
FIG. 7 is a flowchart of a method for a personal computing device to securely log into an application server, according to an example embodiment of the present disclosure.

In FIG. 7, an example is given in flowchart form of the method of the present disclosure to log into an application server 140 after the login software application 100 has been successfully installed in the user's personal computing device 110, without user name or password and by means of an anonymous identifier.

In step 700, the user runs its login software application 100 in its personal computing device 110 and is prompted to unlock the screen lock device previously defined in step 600.

In step 710, the login software application 100 in personal computing device 110 tests the unlock input to the screen lock device and determines whether it is valid or invalid. A valid entry will be the entered PIN matching the PIN defined at login software application 100 installation time, or the user's face or fingerprint being recognized by the biometric verification functionality of the personal computing device 110.

If the unlock input to the screen lock device is deemed invalid in step 715, the login software application 100 denies continued operation to the user. If it is deemed valid in step 720, continued operation is authorized and the user is allowed to select in the login software application 100 an application server 140 for login, in case there is more than one where the user is permitted to log in.

In step 730, the connection is made to the selected application server 140 and a login procedure is requested.

In step 740, the login and access software application 475 in the application server 140 tests whether the request is coming from a genuine copy and valid installation of the login software application 100, and this is achieved through known cryptographic methods. In order to verify that the copy of the login software application 100 is legitimate, the login and access software application 475 may also query the commands sent in steps 660 and 670 to the login software application 100 and confirm whether they are present and identical to those originally issued.

If the test is not successful, then in step 745 the login and access software application 475 in application server 140 denies login access and sends a command to the login software application 100 terminating its operation. The identity details of the login software application 100 and of the personal computing device 110 and other identification details may be recorded by the application server 140 in a security log file.

If the test is successful, then in step 750 the login and access software application 475 in application server 140 authorizes the user login procedure to continue and sends a command to the login software application 100 for it to transmit the user's public key/anonymous identifier.

In step 760, the login and access software application 475 in application server 140 receives the public key/anonymous identifier and searches its user registration database 480 for a matching anonymous identifier. In step 770, the login and access software application 475 in application server 140 tests whether a match was found.

If a match is not found in step 775, the login and access software application 475 denies login access to the user's login software application 100. If a match is found in step 780, the login and access software application 475 grants login access to the user's login software application 100. In step 790, a user session is started at the application server 140, using these or other software applications residing in the personal computing device 110 or in the application server 140. The user session ends in step 795, when the user issues a logout command in the login software application 100 or in the application server 140, or if a pre-set timeout device in the login software application 100 or in the login and access software application 475 is triggered after a given period of user inactivity.

The present invention allows users to securely log into application servers with one click or one touch, where, in the preferred embodiment hereof, no user name or no user memorizable user name and no identity details are disclosed and no password exists, yet the user is positively identified and authenticated solely by means of the user's anonymous identifier.

It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed inventions require more features than are expressly recited in each claim. Rather, inventive aspects lie in less than all features of a single foregoing disclosed embodiment, and each embodiment described herein may contain more than one inventive feature.

While the invention has been particularly shown and described with reference to embodiments thereof, it will be understood by those skilled in the art that various other changes in the form and details may be made without departing from the spirit and scope of the invention.

The invention claimed is:

1. A method to execute a secure user login procedure in an application server, comprising:
   a. running a login software application in a personal computing device,
   b. connecting, by means of the login software application in the personal computing device, to an application server of interest,
   c. transmitting to the application server a login request comprising an anonymous identifier, the anonymous identifier being known to the login software application in the personal computing device and to a login and access software application in the application server, and wherein the anonymous identifier is one of a pair of cryptographic keys,
   d. receiving in the application server the login request from the login software application in the personal computing device,
   e. validating the anonymous identifier by means of the login and access software application by matching the received anonymous identifier to a user registration database containing anonymous identifiers, and
   f. granting, upon successfully matching the anonymous identifier, the personal computing device access to the application server for a user session.

2. The method of claim 1, wherein the anonymous identifier is a public cryptographic key derived from a randomly generated private cryptographic key in an asymmetric system.

3. The method of claim 2, wherein the anonymous identifier comprises at least 10 characters.

4. The method of claim 1, wherein the login or access request requires a single user action in the login software application.

5. The method of claim 1, further comprising unlocking a screen lock device stored on the personal computing device, by inputting into the personal computing device a code.

6. The method of claim 1, further comprising a step of installing the login software application on the personal computing device, wherein the step of running the login software application in the personal computing device is performed after the step of installing the login software application on the personal computing device.

7. The method of claim 6, wherein the installing further comprises generating the anonymous identifier.

8. The method of claim 6, wherein the installing further comprises storing a screen lock device in the personal computing device.

9. The method of claim 6, the method further comprises registering the user, identified by the anonymous identifier, in the application server.

10. The method of claim 9, wherein the registering of the user comprises validating the login software application having transmitted a request for registration of the user.

11. The method of claim 9, wherein the registering comprises recording the anonymous identifier, transmitted by the login software application, in the user registration database in the application server.

12. The method of claim 6, wherein the installing further comprises validating the user, the validating comprising:
   a. entering the name and personal identifiers of the user in the login software application, b. transmitting, by means of the login software application, the name and personal identifiers to an identity verification server,
c. matching, by means of an identity verification software application in the identity verification server, the received name and personal identifiers with stored names and personal identifiers,
d. reading, on obtaining a match, by means of the identity verification software application, a contact number or an electronic address associated with the match,
e. sending, by means of the identity verification software application, a request for confirmation to one of the contact number or the electronic address,
f. transmitting, by means of an input to the personal computing device, a response to the request for confirmation to the identity verification software application in the identity verification server,
g. transmitting, on receiving a positive response, by means of the identity verification software application, a command to the login software application that the installation is concluded.

13. The method of claim 12, wherein the command, transmitted upon positive response by the login software application, comprises user confirmation data.

14. The method of claim 12, wherein the receipt by the application server of an incoming request to log in is authenticated by the identity verification server as being associated with a valid anonymous identifier.

15. A system comprising a personal computing device and an application server, the personal computing device having a login software application and an anonymous identifier stored therein, wherein the system is configured, upon input by a user, to transmit a login request comprising the anonymous identifier to a login and access software application in the application server and the personal computing device to be granted access to the application server for a user session, upon successfully matching the transmitted anonymous identifier by means of the login and access software application to a user registration database containing anonymous identifiers, wherein the anonymous identifier is known to the login software application in the personal computing device and to the login and access software application in the application server, and the anonymous identifier further is one of a pair of cryptographic keys.

16. A non-transitory machine-readable storage medium having instructions stored thereon, the instructions when executed, any one of the instructions being executed either by a processor in a personal computing device or by a processor in an application server, cause the processors to carry out the steps comprising:
a. running a login software application in the personal computing device,
b. connecting, by means of the login software application in the personal computing device, to an application server of interest,
c. transmitting to the application server a login request comprising an anonymous identifier, the anonymous identifier being known to the login software application in the personal computing device and to a login and access software application in the application server, and wherein the anonymous identifier is one of a pair of cryptographic keys,
d. receiving in the application server the login request from the login software application in the personal computing device,
e. validating the anonymous identifier by means of the login and access software application by matching the received anonymous identifier to a user registration database containing anonymous identifiers, and
f. granting, upon matching the anonymous identifier, the personal computing device access to the application server for a user session.

17. The non-transitory machine-readable storage medium of claim 16, further having instructions stored thereon, the instructions when executed, any one of the instructions being executed either by the processor in the personal computing device or by a processor in an identity verification server, cause the respective processors to carry out the steps of validating the user, the validating comprising:
a. entering the name and personal identifiers of the user in the login software application,
b. transmitting, by means of the login software application, the name and personal identifiers to an identity verification server,
c. matching, by means of an identity verification software application in the identity verification server, the received name and personal identifiers with stored names and personal identifiers,
d. reading, on obtaining a match, by means of the identity verification software application, a contact number or an electronic address associated with the match,
e. sending, by means of the identity verification software application, a request for confirmation to one of the contact number or the electronic address,
f. transmitting, by means of an input to the personal computing device, a response to the request for confirmation to the identity verification software application in the identity verification server,
g. transmitting, on receiving a positive response, by means of the identity verification software application, a command to the login software application that an installation of the login software application on the personal computing device is concluded.

* * * * *